United States Patent
Ekstrand et al.

(10) Patent No.: US 11,630,571 B2
(45) Date of Patent: Apr. 18, 2023

(54) GRAPHIC DISPLAY METHOD AND APPARATUS

(71) Applicant: HUAWEI TECHNOLOGIES CO., LTD., Guangdong (CN)

(72) Inventors: Simon Ekstrand, Eslov (SE); Fredrik Andreasson, Lund (SE); Johan Larsby, Lund (SE); Xueyan Huang, Shenzhen (CN); Bo Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 17/093,188

(22) Filed: Nov. 9, 2020

(65) Prior Publication Data

US 2021/0055859 A1 Feb. 25, 2021

Related U.S. Application Data

(63) Continuation of application No. 16/387,386, filed on Apr. 17, 2019, now Pat. No. 10,852,941, which is a
(Continued)

(30) Foreign Application Priority Data

Oct. 19, 2016 (CN) .......................... 201610913815.8

(51) Int. Cl.
*G06F 3/0482* (2013.01)
*G06F 3/04883* (2022.01)
(Continued)

(52) U.S. Cl.
CPC ........ *G06F 3/04883* (2013.01); *G06F 3/0482* (2013.01); *G06F 3/0488* (2013.01); *G06F 3/04845* (2013.01); *G06F 2203/04803* (2013.01)

(58) Field of Classification Search
CPC ......... G06F 1/1643; G06F 2203/04803; G06F 3/0482; G06F 3/04845; G06F 3/0488; G06F 3/04883; G06F 3/04886
See application file for complete search history.

(56) References Cited

U.S. PATENT DOCUMENTS 5,565,888 A * 10/1996 Selker ................. G06F 3/04842
715/823
6,073,036 A * 6/2000 Heikkinen .......... G06F 3/04842
455/550.1
(Continued)

FOREIGN PATENT DOCUMENTS

| CN | 101459737 A | 6/2009 |
| CN | 102479030 A | 5/2012 |

(Continued)

OTHER PUBLICATIONS

[No Author] [online], "Introduction of small size large-size Samsung S6 Edge surface screen operation," PConline Original, Retrieved from URL<http://mobile.pconline.com.cn/620/6203376.html>, Source: PConline Original, Mar. 11, 2015, 11 pages (machine translation).
(Continued)

*Primary Examiner* — Ram A Mistry
(74) *Attorney, Agent, or Firm* — Fish & Richardson P.C.

(57) ABSTRACT

A graphic display method and apparatus are provided. In the graphic display method, a terminal may detect a touch operation on a screen when there is a to-be-processed event; obtain touch point coordinates of the touch operation; display, in a position indicated by the touch point coordinates, a touch graphic used to indicate the touch operation, and display, on the screen based on the touch point coordinates, an operation indication graphic corresponding to the to-be-processed event. The touch graphic and the operation indication graphic are displayed on the screen to enable a user to see a current to-be-processed event in a more intuitive and
(Continued)

vivid manner, thereby reducing a misoperation rate of a touch operation and improving operation experience of the user.

18 Claims, 7 Drawing Sheets

Related U.S. Application Data continuation of application No. PCT/CN2017/106826, filed on Oct. 19, 2017.

(51) Int. Cl.
*G06F 3/04845* (2022.01)
*G06F 3/0488* (2022.01)

(56) References Cited

U.S. PATENT DOCUMENTS

| | | | |
|---|---|---|---|
| 9,405,456 B2 | 8/2016 | Privault et al. | |
| 2002/0180763 A1* | 12/2002 | Kung | G06F 3/0488 345/660 |
| 2010/0269040 A1* | 10/2010 | Lee | G06F 3/04817 715/702 |
| 2011/0022958 A1 | 1/2011 | Kang et al. | |
| 2011/0029934 A1 | 2/2011 | Locker et al. | |
| 2012/0319984 A1* | 12/2012 | Borovsky | G06F 3/04883 345/173 |
| 2013/0174094 A1 | 7/2013 | Heo et al. | |
| 2015/0046831 A1 | 2/2015 | Liang et al. | |
| 2015/0172452 A1* | 6/2015 | Kobayashi | H04M 1/6041 455/414.1 |
| 2015/0370438 A1 | 12/2015 | Ito et al. | |
| 2016/0098184 A1* | 4/2016 | Kim | G06F 3/0414 715/786 |
| 2016/0224234 A1* | 8/2016 | Sheng | G06F 3/0486 |

FOREIGN PATENT DOCUMENTS

| | | |
|---|---|---|
| CN | 102541397 A | 7/2012 |
| CN | 102637115 A | 8/2012 |
| CN | 102799351 A | 11/2012 |
| CN | 102893249 A | 1/2013 |
| CN | 103186342 A | 7/2013 |
| CN | 103543951 A | 1/2014 |
| CN | 106527923 A | 3/2017 |
| WO | 2013155735 A1 | 10/2013 |

OTHER PUBLICATIONS

[No Author] [online], "Vibrant.js—Extract prominent colors from an image," Vibrant.js Showcase, Retrieved from: URL<http://jariz.github.io/vibrant.js/> on Jun. 5, 2019, 2 pages.
3284 [online], "Drop Calling," JAYPEG Works, retrieved from URL<https://jypg.net/works/5529>, 2013, 10 pages (machine translation).
Office Action issued in Chinese Application No. 201610913815.8 dated Feb. 19, 2019, 19 pages (with English translation).
Office Action issued in Chinese Application No. 201610913815.8 dated Sep. 4, 2019, 5 pages.
PCT International Search Report and Written Opinion issued in International Application No. PCT/CN2017/106826 dated Jan. 18, 2018, 23 pages (with English translation).

* cited by examiner

GRAPHIC DISPLAY METHOD AND APPARATUS

CROSS-REFERENCE TO RELATED APPLICATIONS

This application is a continuation of U.S. application Ser. No. 16/387,386, filed on Apr. 17, 2019, which is a continuation of International Application No. PCT/CN2017/106826, filed on Oct. 19, 2017, which claims priority to Chinese Patent 201610913815.8, filed on Oct. 19, 2016. All of the afore-mentioned patent applications are hereby incorporated by reference in their entireties.

TECHNICAL FIELD

This application relates to the field of electronic technologies, and specifically, to a graphic display method and apparatus.

BACKGROUND

As portable terminals gradually become popular and more intelligent, portable terminals are no longer used as communications tools only, but instead are used as intelligent terminals that integrate work, life, and entertainment. To satisfy users' requirements, an intelligent terminal may include a main planar display screen and a lateral curved display screen. Terminals may have different morphological features. Different from a conventional planar display screen, a curved display screen has particular curvature. A curved screen may expand a display area of a terminal and at the same time has a more attractive look.

However, it is found in practice that a touch operation cannot be intuitively displayed on a curved screen, and a misoperation rate of the touch operation is relatively high.

SUMMARY

Embodiments of the present invention provide a touch display method and apparatus to display a touch graphic and an operation indication graphic on a screen in time, thereby reducing a misoperation rate of a touch operation.

A first aspect of the present invention provides a touch display method. The touch display method may include: detecting a touch operation on a screen when there is a to-be-processed event; obtaining touch point coordinates of the touch operation; displaying, in a position indicated by the touch point coordinates, a touch graphic used to indicate the touch operation; and displaying, on the screen based on the touch point coordinates, an operation indication graphic corresponding to the to-be-processed event. In the implementation, when the touch operation is detected, the touch graphic and the operation indication graphic may be displayed on the screen at the same time, so that a misoperation rate of the touch operation can be reduced, and operation experience of a user can be improved. Optionally, the touch display method may be applied to an electronic device having a curved screen. The curved screen includes a main planar display screen and a lateral curved display screen. The lateral curved display screen is an edge part of the curved screen. The touch graphic is displayed on the main planar display screen and the operation indication graphic is displayed on the lateral curved display screen to fully utilize the curved display screen to improve operation experience of a user.

With reference to the implementation of the first aspect of the present invention, in a first possible implementation of the first aspect of the present invention, a terminal may further obtain a pressure value of the touch operation; and adjust a size of the touch graphic based on the pressure value, where the size of the touch graphic is positively correlated to the pressure value.

With reference to the implementation of the first aspect of the present invention, in a second possible implementation of the first aspect of the present invention, the terminal may obtain a pressure value of the touch operation; and adjust a size of the operation indication graphic based on the pressure value, where the size of the operation indication graphic is positively correlated to the pressure value. In the two implementations, a user can be vividly prompted with current pressing strength, making it convenient for the user to adjust pressing strength to protect a screen.

With reference to the implementation of the first aspect of the present invention or the first or second possible implementation of the first aspect, in a third possible implementation of the first aspect of the present invention, the displaying, in a position of the touch point coordinates, a touch graphic used to indicate the touch operation may include: displaying a touch graphic presentation picture in the position of the touch point coordinates, where the touch graphic presentation picture includes a dynamic picture of the touch graphic increasing in size. The touch graphic is displayed in such a way that a touch operation of a user can be displayed more vividly.

With reference to the implementation of the first aspect of the present invention or the first or second possible implementation of the first aspect, in a fourth possible implementation of the first aspect of the present invention, a vertical coordinate of a center point of the touch graphic is the same as a vertical coordinate of a center point of the operation indication graphic; and a distance from a horizontal coordinate of the center point of the touch graphic to any edge of the screen is negatively correlated to a distance from a horizontal coordinate of the center point of the operation indication graphic to the any edge, and the any edge and the operation indication graphic are located on a same side of the screen. In the implementation, the operation indication graphic can move as the touch graphic moves to remind a user of a position of a current touch operation in time.

With reference to the implementation of the first aspect of the present invention or any one of the first to fourth possible implementations of the first aspect, in a fifth possible implementation of the first aspect of the present invention, when a difference between a horizontal coordinate of the center point of the touch graphic and a horizontal coordinate of the center point of the operation indication graphic is a preset value, a graphic obtained by combining the touch graphic and the operation indication graphic is displayed, and an operation instruction corresponding to the operation indication graphic is generated.

With reference to the implementation of the first aspect of the present invention or any one of the first to fourth possible implementations of the first aspect, in a sixth possible implementation of the first aspect of the present invention, the touch graphic is formed by combining one main circle and one auxiliary circle, a center of the main circle is the center point of the touch graphic, coordinates of the center of the main circle are the touch point coordinates, and a ratio of a radius of the main circle to a radius of the auxiliary circle is equal to a preset ratio; and the operation indication graphic is formed by combining one ellipse and one circle, and a center of the circle in the operation indication graphic is the center point of the operation indication graphic.

With reference to the implementation of the first aspect of the present invention or any one of the first to fifth possible implementations of the first aspect, in a seventh possible implementation of the first aspect of the present invention, if the to-be-processed event includes an unlock event and the touch operation is a swipe operation, an unlock instruction is generated when the swipe operation swipes to a position of the operation indication graphic; or, if the to-be-processed event includes an incoming call event, an answer instruction or a reject instruction is generated when the touch point coordinates are in a position of the operation indication graphic.

With reference to the implementation of the first aspect of the present invention or any one of the first to sixth possible implementations of the first aspect, in an eighth possible implementation of the first aspect of the present invention, after the terminal displays, on the screen based on the touch point coordinates, the operation indication graphic corresponding to the to-be-processed event, when no touch point coordinates are detected, a touch graphic disappearance picture may further be displayed in a position of touch point coordinates detected last time, where the touch graphic disappearance picture includes a dynamic picture of the touch graphic decreasing in size.

A second aspect of the present invention further provides a graphic display apparatus, which may include, but is not limited to, a detection module, an obtaining module, and a display module. The foregoing modules may perform related operations in the graphic display method, thereby reducing a misoperation rate of a touch operation and improving operation experience of a user.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
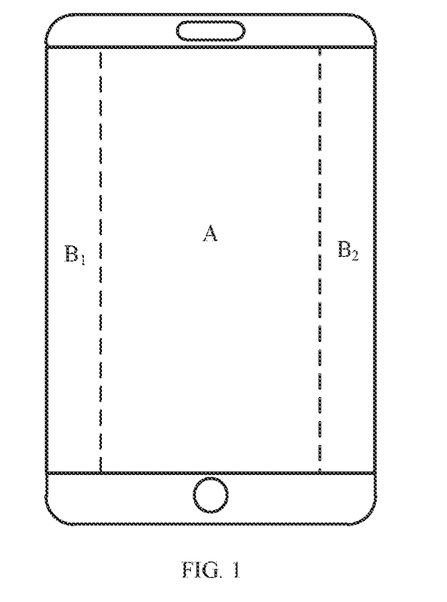
FIG. 1 is a schematic diagram of a main planar display screen and a lateral curved display screen according to an embodiment of the present invention.
Figure 2:
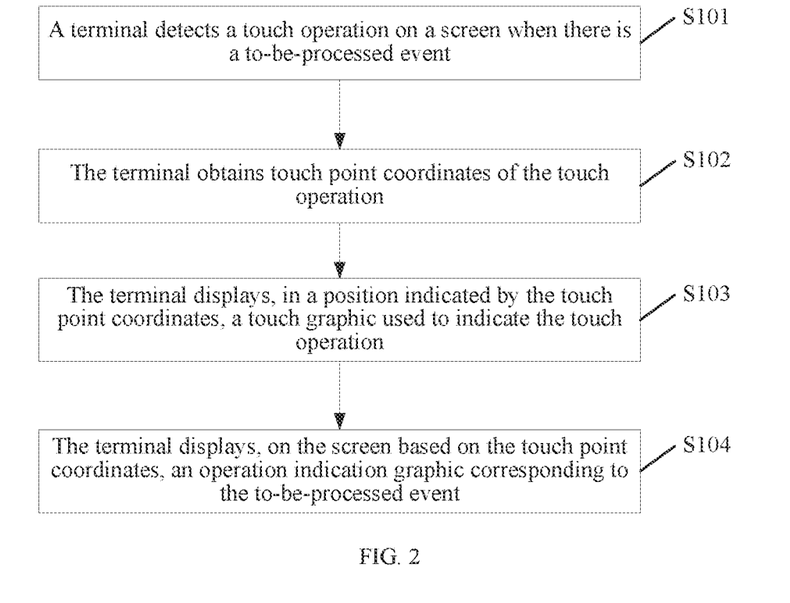
FIG. 2 is a schematic flowchart of a graphic display method according to an embodiment of the present invention.

An embodiment of the present invention provides a graphic display method that may be applied to various terminal devices, for example, terminal devices such as a smartphone, a camera, a media player, and a tablet computer. The terminal device may be an electronic device having a curved screen. The curved screen includes a main planar display screen and a lateral curved display screen. The lateral curved display screen is an edge part of the curved screen, as shown by areas B1 and B2 in FIG. 1. The main planar display screen is a part other than the lateral curved display screen on the curved screen, as shown by an area A in FIG. 1. In the graphic display method in this embodiment of the present invention, a touch graphic and an operation indication graphic may be displayed based on a touch operation, to improve operation experience of a user. Referring to FIG. 2, FIG. 2 is a schematic flowchart of a graphic display method according to an embodiment of the present invention. The graphic display method may include the following steps:

S101: A terminal detects a touch operation on a screen when there is a to-be-processed event.

S102: The terminal obtains touch point coordinates of the touch operation.

S103: The terminal displays, in a position indicated by the touch point coordinates, a touch graphic used to indicate the touch operation.

S104: The terminal displays, on the screen based on the touch point coordinates, an operation indication graphic corresponding to the to-be-processed event.

Figure 3:
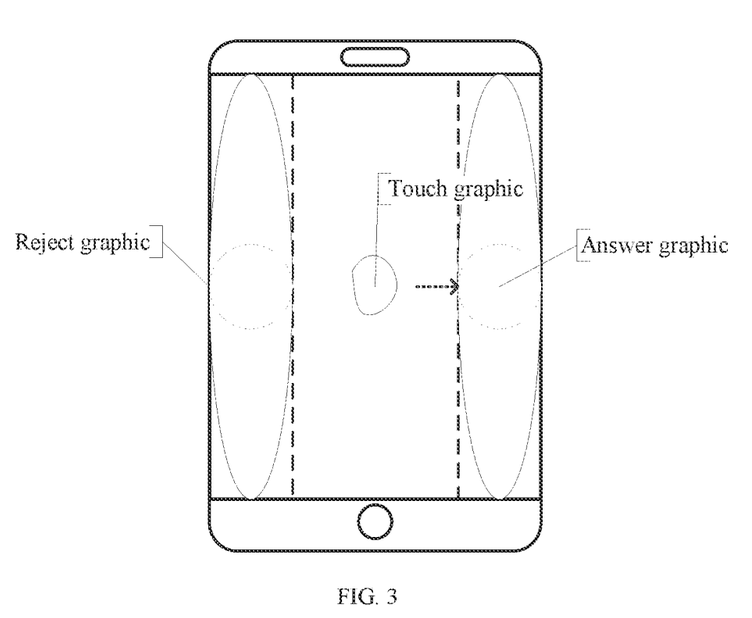
FIG. 3 is a schematic diagram of touch display during an incoming call according to an embodiment of the present invention.
Figure 4:
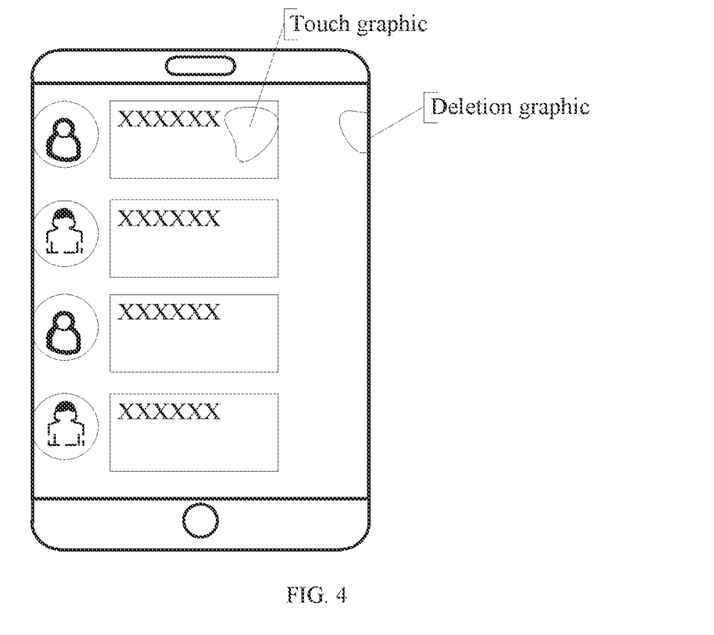
FIG. 4 is a schematic diagram of touch display during SMS message editing according to an embodiment of the present invention.

In this embodiment of the present invention, the to-be-processed event may include an incoming call, unlocking, SMS message editing, alarm clock editing, an operation of other application software, and the like. The touch operation may be an operation of a user's finger, stylus, palm or the like sensed by the terminal by using a touch sensor. Coordinates of a contact point of the finger, the stylus, the palm or the like on a touch display screen are touch point coordinates of the touch operation. The touch graphic is a touch area displayed based on the touch point coordinates of the finger, the stylus, the palm or the like on the touch display screen. The operation indication graphic is an area correspondingly displayed based on the touch graphic and the to-be-processed event. For example, as shown in FIG. 3, if the to-be-processed event is an incoming call, a terminal detects a touch operation on a screen, obtains touch point coordinates to display a touch graphic, and correspondingly displays an operation indication graphic on the screen. Two operation indication graphics including an answer graphic and a reject graphic are respectively located on two sides of the screen. As shown in FIG. 4, if the to-be-processed event is SMS message editing, a terminal detects a touch operation such as a swipe operation on a screen, obtains touch point coordinates to display a touch graphic, and correspondingly displays an operation indication graphic on the right side of the screen. The operation indication graphic may be a deletion graphic for deleting an SMS message.

In this embodiment of the present invention, in addition to the touch point coordinates of the touch operation, the terminal may further obtain a pressure value of the touch operation, and adjust sizes of the touch graphic and the operation indication graphic based on the pressure value. Optionally, the size of the touch graphic is positively correlated to the pressure value, and the size of the operation indication graphic is also positively correlated to the pressure value. For example, a usual pressure value of the touch operation is used as a reference pressure value. When the pressure value of the touch operation is greater than the reference pressure value, the sizes of the touch graphic and the operation indication graphic are increased. When the pressure value of the touch operation is less than the reference pressure value, the sizes of the touch graphic and the operation indication graphic are reduced. Optionally, a correspondence between a pressure level and a proportion for enlarging/shrinking the touch graphic and the operation indication graphic may be set in advance, and display proportions of the touch graphic and the operation indication graphic are determined based on a pressure level corresponding to the pressure value of the touch operation.

In this embodiment of the present invention, the terminal may display a touch graphic presentation picture in the position of the touch point coordinates, where the touch graphic presentation picture includes a dynamic picture of the touch graphic increasing in size, and correspondingly display operation indication graphic presentation pictures on two sides of the screen, where each of the operation indication graphic presentation pictures includes a dynamic picture of the operation indication graphic increasing in size. For example, for an electronic device having a curved screen including a main planar display screen and a lateral curved display screen, the terminal may display a touch graphic presentation animation of the touch operation in the position of the touch point coordinates on the main planar display screen, and display an operation indication graphic presentation animation corresponding to the to-be-processed event on the lateral curved display screen. The touch graphic presentation animation may be displaying the touch graphic of the touch operation in an enlargement manner in the position indicated by the touch point coordinates on the main planar display screen within a preset time period, and displaying the operation indication graphic of the to-be-processed event in an enlargement manner on the lateral curved display screen within the same preset time period. To be specific, the touch graphic is fully transparent at first and gradually turns fully opaque within the preset time period (preferably 300 ms), and the proportion gradually increases from 0 to 100%. Similarly, the operation indication graphic is fully transparent at first and gradually turns fully opaque within the same preset time period, and the proportion gradually increases from 0 to 100%.

Figure 5:
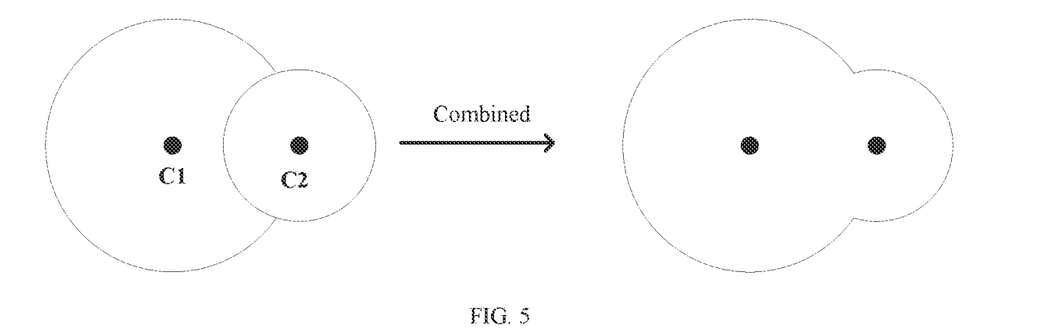
FIG. 5 is a schematic diagram of combining touch graphics according to an embodiment of the present invention.

In this embodiment of the present invention, as shown in FIG. 5, the touch graphic is formed by combining one main circle C1 and one auxiliary circle C2. A formula for combining the main circle C1 and the auxiliary circle C2 is shown in Formula (1):

$$F_1(x, y) = \frac{R_1^2}{(x-x_1)^2 + (y-y_1)^2} + \frac{R_2^2}{(x-x_2)^2 + (y-y_2)^2} \quad (1)$$

where $(x_1, y_1)$ is coordinates of a center of the main circle, namely, the touch point coordinates, and $R_1$ is a radius of the main circle; $(x_2, y_2)$ is coordinates of a center of the auxiliary circle, and $R_2$ is a radius of the auxiliary circle; and $R_1/R_2$ is equal to a preset ratio $k_1$.

The radius $R_1$ of the main circle C1 is related to the size of the touch graphic. The size of the touch graphic is determined by a size of a user's finger or stylus in contact with a display screen. When a finger is used to perform a touch operation, the touch graphic is usually 9 mm to 12 mm. The auxiliary circle is related to the position and size of a protrusion of the touch graphic. When a preset proportion k1 is preferably 0.5, a combined graphic or combined mixed graphic has a better display effect.

In this embodiment of the present invention, the displayed size of the combined touch graphic may be obtained by using an algorithm for reversely determining a critical value. To be specific, the radius of the main circle in the touch graphic is determined based on an eventually displayed size of the touch graphic, to improve an effect of displaying the touch graphic and reduce impact on display of other content on the screen. Based on a critical value determined by using the algorithm for reversely determining a critical value, a part of $F_1(x,y)$ that is greater than the critical value is displayed as the touch graphic, and a part of $F_1(x,y)$ that is less than or equal to the critical value is not displayed. The eventually displayed size or dimension of the touch graphic may be controlled by using the critical value. In this embodiment of the present invention, the critical value is set to 1 by default. For example, the critical value is 1 in a touch graphic during an incoming phone call and unlocking.

In an initial state, the coordinates of the center of the main circle are the same as the coordinates of the center of the auxiliary circle. When the touch operation swipes, a distance from a horizontal coordinate of a center point of the touch graphic to any edge of the screen is negatively correlated to a distance from a horizontal coordinate of a center point of the operation indication graphic to the any edge. The any edge and the operation indication graphic are located on a same side of the curved screen. A ratio of a displacement of the horizontal coordinate of the center point of the touch graphic to a displacement of the horizontal coordinate of the center point of the operation indication graphic may be a fixed ratio k2. The fixed ratio k2 may be a ratio of a radius of a circle in the operation indication graphic to a half of the main planar display screen.

Figure 6:
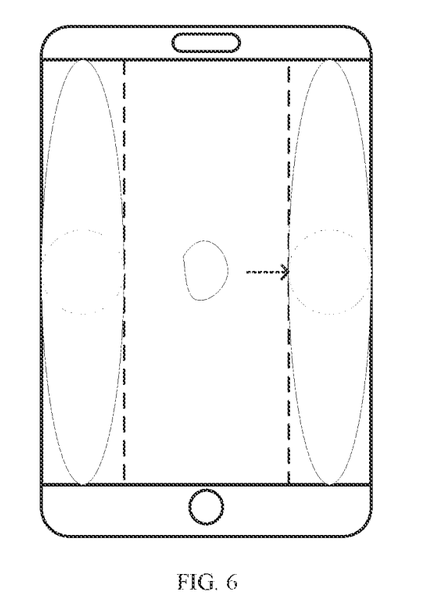
FIG. 6 is a schematic diagram of combining operation indication graphics according to an embodiment of the present invention.

In this embodiment of the present invention, as shown in FIG. 6, the operation indication graphic is formed by combining one ellipse B1 and one circle B2. A formula for combining the ellipse B1 and the circle B2 is shown in Formula (2):

$$F_2(x, y) = \frac{R_3^2}{(x-x_3)^2 + (y-y_3)^2} + \frac{c^2}{\left(\frac{x-x_4}{a}\right)^2 + \left(\frac{y-y_4}{b}\right)^2} \quad (2)$$

where $(x_3, y_3)$ is coordinates of a center of the circle B2 in the operation indication graphic, and $R_3$ is a radius of the circle in the operation indication graphic: $(x_4, y_4)$ is coordinates of a center of the ellipse B1; and c is a focal length of the ellipse B1, where $C=\sqrt{a^2-b^2}$, and the center of the circle B2 is the center point of the operation indication graphic.

In this embodiment of the present invention, if the touch operation is a swipe operation, the touch graphic and the operation indication graphic are moved based on touch point coordinates of the swipe operation. A vertical coordinate of a center point of the touch graphic is the same as a vertical coordinate of a center point of the operation indication graphic. If the to-be-processed event includes an unlock event and the touch operation is a swipe operation, an unlock instruction is generated when the swipe operation swipes to a position of the operation indication graphic. Alternatively, if the to-be-processed event includes an incoming call event, an answer instruction or a reject instruction is generated when the touch point coordinates are in a position of the operation indication graphic.

Figure 7:
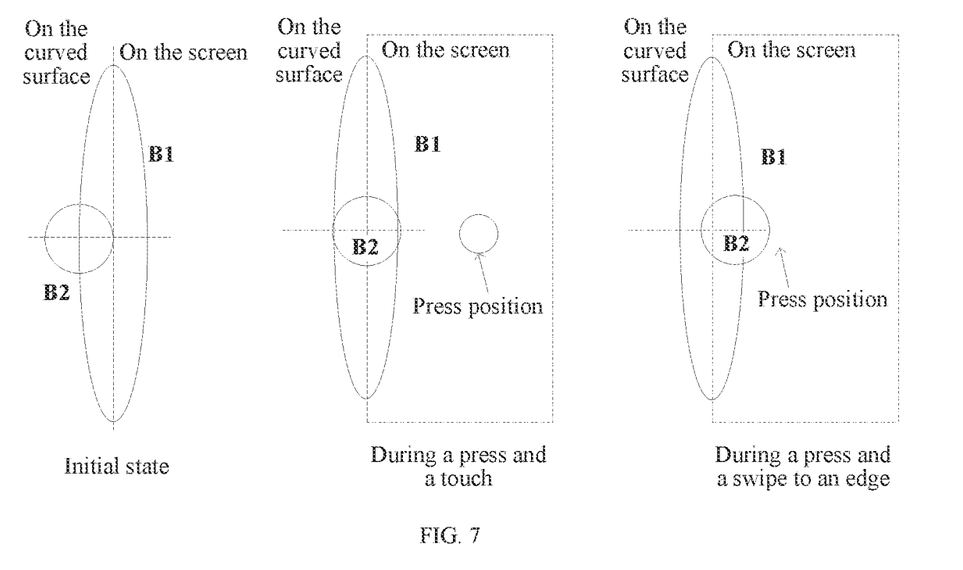
FIG. 7 is a schematic diagram of a touch graphic and an operation indication graphic according to an embodiment of the present invention.

As shown in FIG. 7, for example, the terminal has a main planar display screen and a left lateral curved display screen. In an initial state, a center of a circle in an operation indication graphic is a left vertex of a minor axis of an ellipse. When a touch graphic is gradually displayed on the main planar display screen in a form of a touch graphic presentation picture, as shown in FIG. 7, the center of the circle in the operation indication graphic gradually moves from the left vertex of the minor axis of the ellipse to a center $(x_4, y_4)$ of the ellipse. When the touch graphic gradually approaches the operation indication graphic, as shown in FIG. 7, in a vertical direction, a center point of the touch graphic moves as touch point coordinates continuously change, and the center of the circle B2 in the operation indication graphic also moves with the center point to a right vertex of the minor axis of the ellipse. The vertical coordinate of the center point of the touch graphic is the same as the vertical coordinate of the center of the circle B2 of the operation indication graphic. In a horizontal direction, a distance from the horizontal coordinate of the center point of the touch graphic to a left edge of the left lateral curved display screen is negatively correlated to a distance from the horizontal coordinate of the center point of the operation indication graphic to the left edge of the left lateral curved display screen.

In this embodiment of the present invention, when a difference between a horizontal coordinate of a center point of the touch graphic and a horizontal coordinate of a center point of the operation indication graphic is a preset value, a graphic obtained by combining the touch graphic and the operation indication graphic is displayed, and an operation instruction corresponding to the operation indication graphic is generated. A formula for combining the touch graphic and the operation indication graphic is: $F_3(x,y)=F_1(x,y)+F_2(x,y)$. To be specific, three circles and one ellipse are combined. If the difference between the horizontal coordinate of the center point of the touch graphic and the horizontal coordinate of the center point of the operation indication graphic is greater than a preset threshold, when no touch point coordinates are detected, a touch graphic disappearance picture is displayed in a position of touch point coordinates detected last time, where the touch graphic disappearance picture includes a dynamic picture of the touch graphic decreasing in size: and an operation instruction corresponding to the operation indication graphic is not generated.

A formula for combining a plurality of circles k and a plurality of ellipses n is as follows:

$$F(x, y) = \sum_{k}^{1} \frac{R^2}{(x-x_k)^2 + (y-y_k)^2} + \sum_{n}^{k+1} \frac{c^2}{\left(\frac{x-x_n}{a}\right)^2 + \left(\frac{y-y_n}{b}\right)^2}$$

where $(x_k, y_k)$ is a center of a corresponding circle, $(x_n, y_n)$ is a center of a corresponding ellipse, R is a radius of each circle, and the radii of the circles may be the same or may be different; and a and b are values of a major axis and a minor axis of an ellipse, and c is a focal point of an ellipse.

It can be learned that, in this embodiment of the present invention, the terminal detects a touch operation on a screen when there is a to-be-processed event; obtains touch point coordinates of the touch operation; displays, in a position indicated by the touch point coordinates, a touch graphic used to indicate the touch operation, and displays, on the screen based on the touch point coordinates, an operation indication graphic corresponding to the to-be-processed event. In this way, the touch graphic and the operation indication graphic are displayed on the screen to enable a user to see a current to-be-processed event in a more intuitive and vivid manner, thereby reducing a misoperation rate of a touch operation and improving operation experience of the user.

Figure 8:
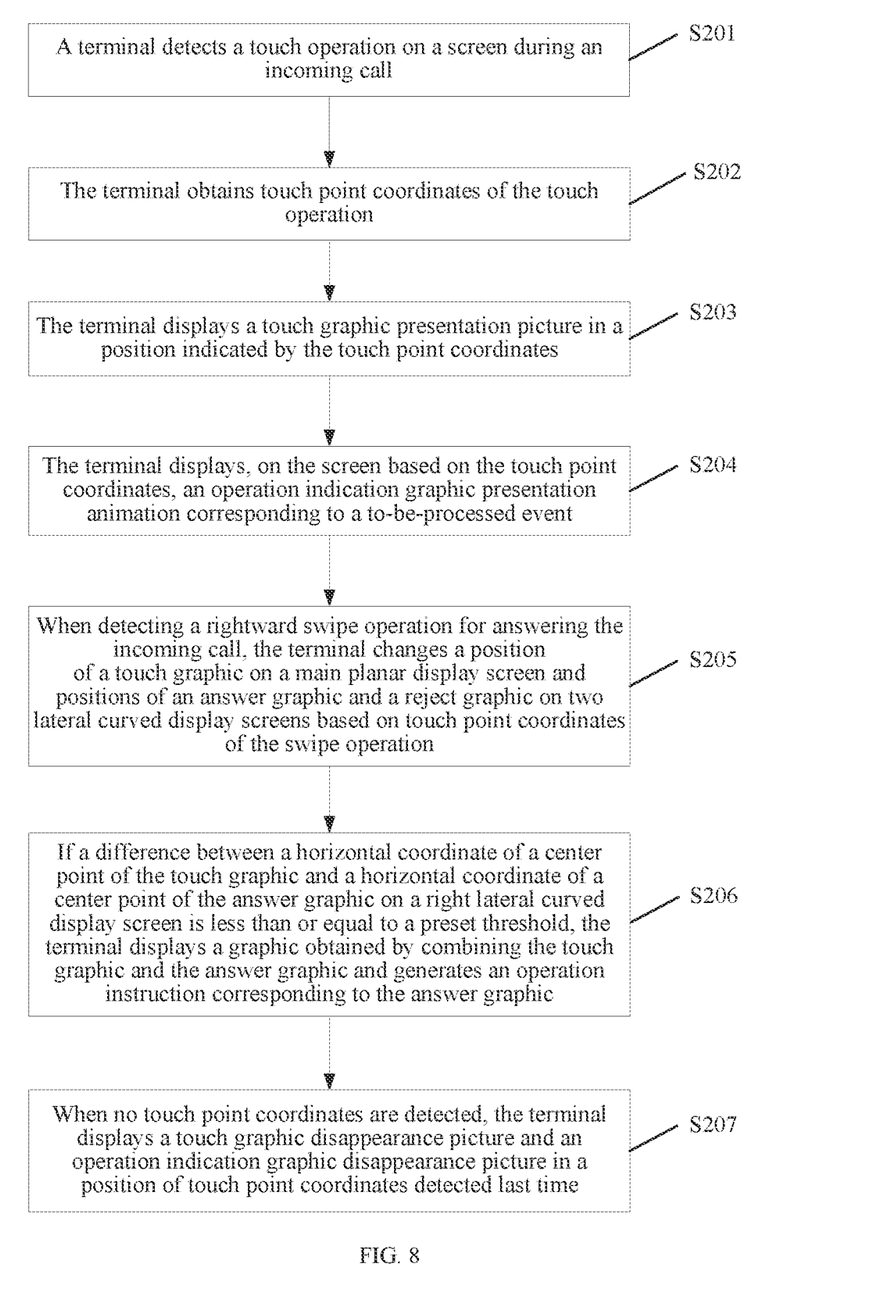
FIG. 8 is a schematic flowchart of another graphic display method according to an embodiment of the present invention.
Figure 9:
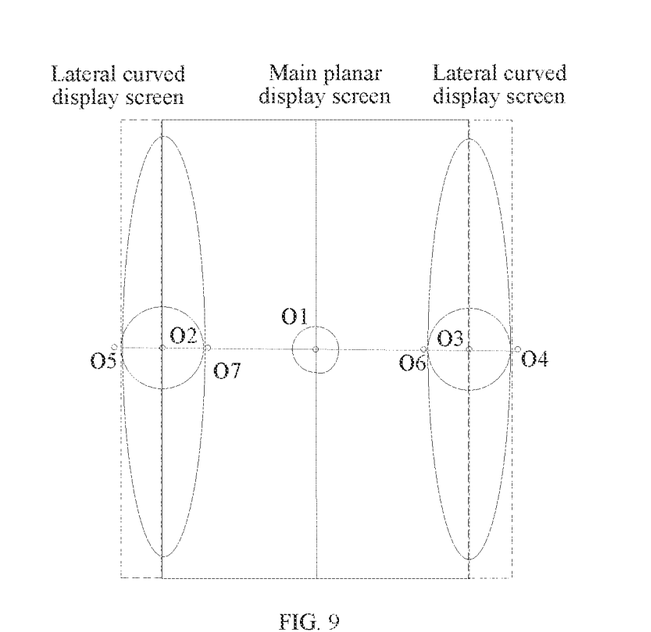
FIG. 9 is a schematic diagram of another touch graphic and another operation indication graphic according to an embodiment of the present invention.

Referring to FIG. 8, FIG. 8 is a schematic flowchart of another graphic display method according to an embodiment of the present invention. In the graphic display method shown in FIG. 8, for example, a user swipes rightwards to answer a phone call. As shown in FIG. 9, it is assumed that an initial press made by the user on a display screen is at the center of a main planar display screen. To be specific, a center O1 of a main circle in a touch graphic is the center of the main planar display screen. O4 and O5 are initial positions of centers of circles in operation indication graphics when the user makes no press. In this case, the operation indication graphics are not displayed. O2 and O3 are positions of the centers of the circles in the operation indication graphics when the user makes the initial press on the display screen but has not moved the finger yet. At this time, the operation indication graphics start to be displayed. O6 and O7 are the farthest ends to which the centers of the circles in the operation indication graphics can move when the touch graphic moves with the user's finger to a left lateral curved display screen or a right lateral curved display screen. At this time, a displayed size of the operation indication graphic is largest. The graphic display method may include the following steps.

S201: A terminal detects a touch operation on a screen during an incoming call.

S202: The terminal obtains touch point coordinates of the touch operation.

S203: The terminal displays a touch graphic presentation picture in a position indicated by the touch point coordinates.

S204: The terminal displays, on the screen based on the touch point coordinates, an operation indication graphic presentation animation corresponding to a to-be-processed event.

In this embodiment of the present invention, the terminal generates a touch graphic of the touch operation based on coordinates of O1 (the coordinates of the touch point at this time) and Combination Formula (1) for a touch graphic, and generates an answer graphic and a reject graphic for the incoming call based on coordinates of O1, O3, and O2 and Combination Formula (2) for an operation indication graphic.

S205: When detecting a rightward swipe operation for answering the incoming call, the terminal changes a position of a touch graphic on a main planar display screen and positions of an answer graphic and a reject graphic on two lateral curved display screens based on touch point coordinates of the swipe operation.

S206: If a difference between a horizontal coordinate of a center point of the touch graphic and a horizontal coordinate of a center point of the answer graphic on the right lateral curved display screen is less than or equal to a preset threshold, the terminal displays a graphic obtained by combining the touch graphic and the answer graphic and generates an operation instruction corresponding to the answer graphic.

The preset threshold may be used to determine whether an answer condition is satisfied or may be used to determine whether a combination condition is satisfied. Optionally, a threshold of the answer condition may be the same as or different from a threshold of the combination condition.

S207: When detecting no touch point coordinates, the terminal displays a touch graphic disappearance picture and an operation indication graphic disappearance picture in a position of touch point coordinates detected last time.

The touch graphic disappearance picture includes a dynamic picture of the touch graphic decreasing in size. The operation indication graphic disappearance picture includes a dynamic picture of the operation indication graphic decreasing in size.

When the coordinates of the center point of the touch graphic, namely, the touch point coordinates, move from O1 to O3, the center point of the answer graphic on the right lateral curved display screen moves from O3 to O6. When the touch point coordinates reach the position of O3, the center point of the answer graphic moves to the position of O6, and a protrusion of the answer graphic reaches a largest height. A center point of the reject graphic on the left lateral curved display screen moves from O2 to O5, and the reject graphic gradually changes from an initial protruding state to a non-protruding state. When the touch point coordinates continue to move from O3 to O4, the center point of the answer graphic on the right lateral curved display screen moves from O6 to O4. The protrusion of the answer graphic gradually changes from the largest height to a non-protruding state.

It should be noted that when the answer condition is met and the touch graphic and the answer graphic are not combined, although the touch operation of the user does not leave a screen, the touch graphic and the answer graphic disappear. If a distance from a horizontal coordinate of a position in which the touch operation of the user ends to a right edge of the right lateral curved display screen is greater than a preset threshold (for example, the preset threshold is one fifth of a total width of the main planar display screen), unlocking fails, and both transparency and scaling ratio of the touch graphic change from 1 (100%) to 0. The touch graphic disappears in a current position, and a disappearance time period is equal to a preset presentation time period. Meanwhile, the center point of the answer graphic moves from the current position to O4, the center point of the reject graphic moves from the current position to O5, and the answer graphic and the reject graphic gradually disappear. Meanwhile, transparency of ellipses in the left lateral curved display screen and the right lateral curved display screen changes from 1 to 0. In other words, the ellipses also gradually disappear.

Figure 10:
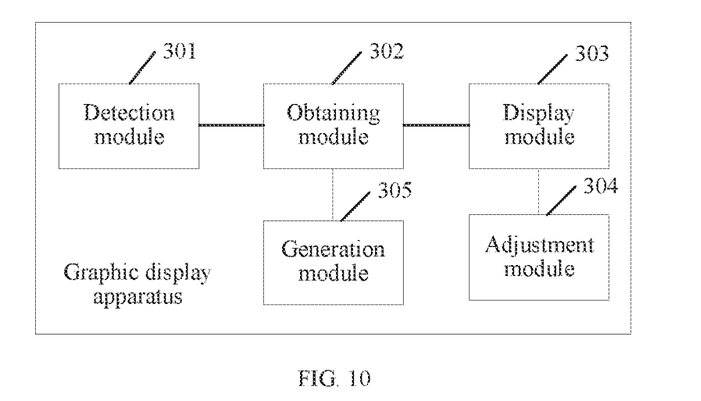
FIG. 10 is a schematic structural diagram of a graphic display apparatus according to an embodiment of the present invention.

Referring to FIG. 10, FIG. 10 is a schematic structural diagram of a graphic display apparatus according to an embodiment of the present invention. The graphic display apparatus may be applied to an electronic device having a curved screen. The curved screen includes a main planar display screen and a lateral curved display screen. The lateral curved display screen is an edge part of the curved screen. The main planar display screen is a part other than the lateral curved display screen on the curved screen. As shown in FIG. 10, the graphic display apparatus may include the following modules:

a detection module 301, configured to detect a touch operation on a screen when there is a to-be-processed event:

an obtaining module 302, configured to obtain touch point coordinates of the touch operation; and a display module 303, configured to display, in a position indicated by the touch point coordinates, a touch graphic used to indicate the touch operation, where the display module 303 is further configured to display, on the screen based on the touch point coordinates, an operation indication graphic corresponding to the to-be-processed event.

In an optional implementation, the obtaining module 302 is further configured to obtain a pressure value of the touch operation, and correspondingly, the graphic display apparatus shown in FIG. 10 further includes:

an adjustment module 304, configured to adjust a size of the touch graphic based on the pressure value, where the size of the touch graphic is positively correlated to the pressure value.

In another optional implementation, the obtaining module 302 is further configured to obtain a pressure value of the touch operation, and correspondingly, the graphic display apparatus shown in FIG. 10 further includes: an adjustment module 304, configured to adjust a size of the operation indication graphic based on the pressure value, where the size of the operation indication graphic is positively correlated to the pressure value.

In this embodiment of the present invention, the adjustment modules in the foregoing two implementations may exist at the same time to respectively perform the foregoing two operations. This is not limited in this embodiment of the present invention.

In this embodiment of the present invention, the display module 303 is specifically configured to: when displaying, in the position of the touch point coordinates, the touch graphic used to indicate the touch operation, display a touch graphic presentation picture in the position of the touch point coordinates, where the touch graphic presentation picture includes a dynamic picture of the touch graphic increasing in size.

In this embodiment of the present invention, a vertical coordinate of a center point of the touch graphic is the same as a vertical coordinate of a center point of the operation indication graphic; and a distance from a horizontal coordinate of the center point of the touch graphic to any edge of the screen is negatively correlated to a distance from a horizontal coordinate of the center point of the operation indication graphic to the any edge, and the any edge and the operation indication graphic are located on a same side of the screen.

In this embodiment of the present invention, the display module 303 is further configured to: when a difference between a horizontal coordinate of a center point of the touch graphic and a horizontal coordinate of a center point of the operation indication graphic is a preset value, display a graphic obtained by combining the touch graphic and the operation indication graphic, and generate an operation instruction corresponding to the operation indication graphic.

In this embodiment of the present invention, the touch graphic is formed by combining one main circle and one auxiliary circle, a center of the main circle is the center point of the touch graphic, coordinates of the center of the main circle are the touch point coordinates, and a ratio of a radius of the main circle to a radius of the auxiliary circle is equal to a preset ratio; and the operation indication graphic is formed by combining one ellipse and one circle, and a center of the circle in the operation indication graphic is the center point of the operation indication graphic. For details, refer to related content of Combination Formula (1) for a touch graphic and Combination Formula (2) for an operation indication graphic in the foregoing embodiment. This is not limited in this embodiment of the present invention.

In this embodiment of the present invention, if the to-be-processed event includes an unlock event and the touch operation is a swipe operation, the graphic display apparatus shown in FIG. 10 may further include: a generation module 305, configured to generate an unlock instruction when the swipe operation swipes to a position of the operation indication graphic. Alternatively, if the to-be-processed event includes an incoming call event, the graphic display apparatus shown in FIG. 10 further includes: a generation module 305, configured to generate an answer instruction or a reject instruction when the touch point coordinates are in a position of the operation indication graphic. In this embodiment of the present invention, the generation module may respectively perform the foregoing two operations. This is not limited in this embodiment of the present invention.

In this embodiment of the present invention, the display module 303 is further configured to: after displaying, on the screen based on the touch point coordinates, the operation indication graphic corresponding to the to-be-processed event, when no touch point coordinates are detected, display a touch graphic disappearance picture in a position of touch point coordinates detected last time, where the touch graphic disappearance picture includes a dynamic picture of the touch graphic decreasing in size.

In this embodiment of the present invention, the graphic display apparatus may perform related operations of an example in which a user swipes rightwards to answer a phone call. For details, refer to related description corresponding to FIG. 8 and FIG. 9. Details are not described herein again.

Figure 11:
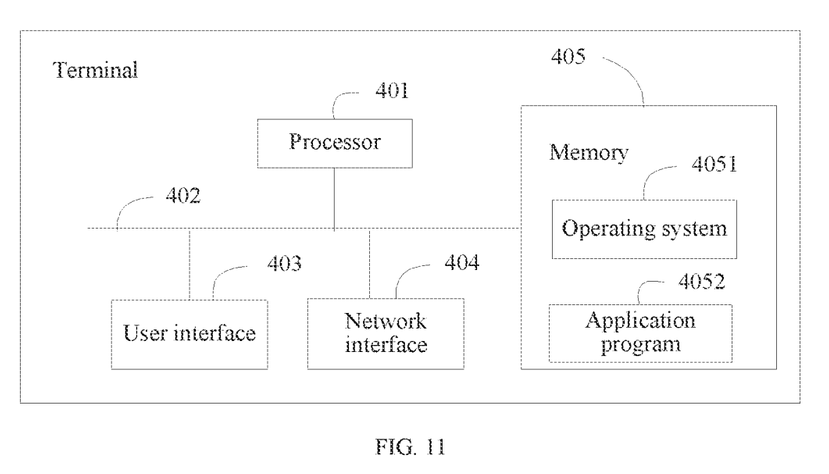
FIG. 11 is a schematic structural diagram of a terminal according to an embodiment of the present invention.

Referring to FIG. 11, FIG. 11 is a schematic structural diagram of a terminal according to an embodiment of the present invention. The terminal may include at least one processor 401 such as a CPU, at least one network interface 404 or another user interface 403, a memory 405, and at least one communications bus 402. The communications bus 402 is configured to implement connection and communication between these components. The user interface 403 may optionally include a wireless interface and a wired interface. The user interface 403 may include a screen. The screen may be a curved screen. The curved screen includes a main planar display screen and a lateral curved display screen. The lateral curved display screen is an edge part of the curved screen. The main planar display screen is a part other than the lateral curved display screen on the curved screen. The network interface 404 may optionally include a Wi-Fi interface and another wireless interface. The memory 405 may include a high-speed RAM memory, or may include a non-volatile memory (non-volatile memory), for example, at least one magnetic disk memory. The memory 405 may optionally include at least one storage apparatus far away from the processor 401.

In some implementations, the memory 405 stores the following elements, executable modules or data structures, or a subset thereof, or an extension set thereof:

an operating system 4051, including various system programs and configured to implement various basic services and process a hardware-based task; and an application program 4052, including various application programs such as a device control service program and a device recognition service program, and configured to implement various application services.

Specifically, the processor 401 is configured to invoke a program stored in the memory 405 to perform the following operations:

detecting a touch operation on a screen when there is a to-be-processed event;

obtaining touch point coordinates of the touch operation;

displaying, in a position indicated by the touch point coordinates, a touch graphic used to indicate the touch operation; and displaying, on the screen based on the touch point coordinates, an operation indication graphic corresponding to the to-be-processed event.

In this embodiment of the present invention, the processor 401 is configured to invoke a program stored in the memory 405 to further perform the following operations:

obtaining a pressure value of the touch operation; and adjusting a size of the touch graphic based on the pressure value, where the size of the touch graphic is positively correlated to the pressure value.

In this embodiment of the present invention, the processor 401 is configured to invoke a program stored in the memory 405 to further perform the following operations:

obtaining a pressure value of the touch operation; and adjusting a size of the operation indication graphic based on the pressure value, where the size of the operation indication graphic is positively correlated to the pressure value.

In this embodiment of the present invention, the processor 401 is configured to invoke a program stored in the memory 405 to specifically perform, when displaying, in the position of the touch point coordinates, the touch graphic used to indicate the touch operation, the following operation:

displaying a touch graphic presentation picture in the position of the touch point coordinates, where the touch graphic presentation picture includes a dynamic picture of the touch graphic increasing in size.

In this embodiment of the present invention, a vertical coordinate of a center point of the touch graphic is the same as a vertical coordinate of a center point of the operation indication graphic; and a distance from a horizontal coordinate of the center point of the touch graphic to any edge of the screen is negatively correlated to a distance from a horizontal coordinate of the center point of the operation indication graphic to the any edge, and the any edge and the operation indication graphic are located on a same side of the screen.

In this embodiment of the present invention, the processor 401 is configured to invoke a program stored in the memory 405 to further perform the following operations:

when a difference between a horizontal coordinate of a center point of the touch graphic and a horizontal coordinate of a center point of the operation indication graphic is a preset value, displaying a graphic obtained by combining the touch graphic and the operation indication graphic, and generating an operation instruction corresponding to the operation indication graphic.

In this embodiment of the present invention, the touch graphic is formed by combining one main circle and one auxiliary circle, a center of the main circle is the center point of the touch graphic, coordinates of the center of the main circle are the touch point coordinates, and a ratio of a radius of the main circle to a radius of the auxiliary circle is equal to a preset ratio; and the operation indication graphic is formed by combining one ellipse and one circle, and a center of the circle in the operation indication graphic is the center point of the operation indication graphic.

In this embodiment of the present invention, if the to-be-processed event includes an unlock event and the touch operation is a swipe operation, the processor 401 is configured to invoke a program stored in the memory 405 to further perform the following operation:

generating an unlock instruction when the swipe operation swipes to a position of the operation indication graphic; or if the to-be-processed event includes an incoming call event, the processor 401 is configured to invoke a program stored in the memory 405 to further perform the following operation: generating an answer instruction or a reject instruction when the touch point coordinates are in a position of the operation indication graphic.

In this embodiment of the present invention, the processor 401 is configured to invoke a program stored in the memory 405 to further perform, after displaying, on the screen based on the touch point coordinates, the operation indication graphic corresponding to the to-be-processed event, the following operation:

when no touch point coordinates are detected, displaying a touch graphic disappearance picture in a position of touch point coordinates detected last time, where the touch graphic disappearance picture includes a dynamic picture of the touch graphic decreasing in size.

In this embodiment of the present invention, the terminal shown in FIG. 11 may perform related steps in the foregoing method embodiment. Details are not described herein again.

The graphic display method and terminal provided in the embodiments of the present invention are described above in detail. In this specification, specific examples are used to describe the principle and implementations of the present invention, and the description of the embodiments is only intended to help understand the method and core idea of the present invention. Meanwhile, a person of ordinary skill in the art may, based on the idea of the present invention, make modifications with respect to the specific implementations and the application scope. Therefore, the content of this specification shall not be construed as a limitation to the present invention.

What is claimed is:

1. An interface graphic display method for a terminal with a curved touch screen having a main planar display area and first and second curved edge portions located on two sides of the main planar display area, the method comprising:
    detecting a touch operation on the main planar display area when the terminal displaying an unlocking interface;
    in response to detecting the touch operation, displaying on the main planar display area a touch graphic that indicates a press position of the touch operation and displaying an operation indication graphic on the first curved edge portion or on the second curved edge portion, wherein the operation indication graphic is formed by combining an ellipse and a circle, and the touch graphic is formed by combining a main circle and an auxiliary circle, and the auxiliary circle is related to a position and size of a protrusion of the touch graphic;
    detecting that the touch graphic is being moved by user input towards the operation indication graphic;
    in response to detecting that the touch graphic is being moved towards the operation indication graphic, enlarging a protrusion of the operation indication graphic towards the touch graphic; and
    unlocking the terminal when the touch graphic and the operation indication graphic are connected or overlapping.

2. The method according to claim 1, further comprising:
    obtaining a pressure value of the touch operation; and
    adjusting a size of the touch graphic based on the pressure value, wherein the size of the touch graphic is positively correlated to the pressure value.

3. The method according to claim 1, further comprising:
    obtaining a pressure value of the touch operation; and
    adjusting a size of the operation indication graphic based on the pressure value, wherein the size of the operation indication graphic is positively correlated to the pressure value.

4. The method according to claim 1, wherein the protrusion is formed and enlarged by moving the circle towards the touch graphic along with a minor axis of the ellipse.

5. The method according to claim 1, wherein the operation indication graphic is partially displayed on the main planar display area of the curved touch screen.

6. The method according to claim 1, further comprising:
    displaying a disappearance picture of the touch graphic when the touch graphic and the operation indication graphic are not connected or overlapped but the touch operation is no longer detected.

7. A terminal, comprising:
    a curved touch screen having a main planar display area and first and second curved edge portions located on two sides of the main planar display area;
    a memory storing instructions; and
    one or more processors in communication with the memory and configured to execute the instructions to:
    detect a touch operation on the main planar display area of the curved touch screen when the terminal displaying an unlocking interface;
    in response to detecting the touch operation, display on the main planar display area a touch graphic that indicates a press position of the touch operation and display an operation indication graphic on the first curved edge portion or on the second curved edge portion, wherein the operation indication graphic is formed by combining an ellipse and a circle, and the touch graphic is formed by combining a main circle and an auxiliary circle, and the auxiliary circle is related to a position and size of a protrusion of the touch graphic;
    detect that the touch graphic is being moved by user input towards the operation indication graphic;
    in response to detecting that the touch graphic is being moved towards the operation indication graphic, enlarge a protrusion of the operation indication graphic towards the touch graphic; and
    unlocking the terminal when the touch graphic and the operation indication graphic are connected or overlapping.

8. The terminal according to claim 7, wherein the one or more processors further execute the instructions to:
    obtain a pressure value of the touch operation; and
    adjust a size of the touch graphic based on the pressure value, wherein the size of the touch graphic is positively correlated to the pressure value.

9. The terminal according to claim 7, wherein the one or more processors further execute the instructions to:
    obtain a pressure value of the touch operation; and
    adjust a size of the operation indication graphic based on the pressure value, wherein the size of the operation indication graphic is positively correlated to the pressure value.

10. The terminal according to claim 7, wherein the protrusion is formed and enlarged by moving the circle towards the touch graphic along with a minor axis of the ellipse.

11. The terminal according to claim 7, wherein the one or more processors further execute the instructions to:
   display a disappearance picture of the touch graphic when the touch graphic and the operation indication graphic are not connected or overlapped but the touch operation is no longer detected.

12. The terminal according to claim 7, wherein the operation indication graphic is partially displayed on the main planar display area of the cured touch screen.

13. A non-transitory storage medium for storing instructions, wherein the instructions, when executed by one or more processors of a terminal with a curved touch screen having a main planar display area and first and second curved edge portions located on two sides of the main planar display area, cause the terminal to:
   detect a touch operation on the main planar display area of the curved touch screen when the terminal displaying an unlocking interface;
   in response to detecting the touch operation, display on the main planar display area a touch graphic that indicates a press position of the touch operation and display an operation indication graphic on the first curved edge portion or on the second curved edge portion, wherein the operation indication graphic is formed by combining an ellipse and a circle, and the touch graphic is formed by combining a main circle and an auxiliary circle, and the auxiliary circle is related to a position and size of a protrusion of the touch graphic;
   detect that the touch graphic is being moved by user input towards the operation indication graphic;
   in response to detecting that the touch graphic is being moved towards the operation indication graphic, enlarge a protrusion of the operation indication graphic towards the touch graphic; and
   unlocking the terminal when the touch graphic and the operation indication graphic are connected or overlapping.

14. The non-transitory storage medium according to claim 13, wherein the one or more processors of the terminal further cause the terminal to:
   obtain a pressure value of the touch operation; and
   adjust a size of the touch graphic based on the pressure value, wherein the size of the touch graphic is positively correlated to the pressure value.

15. The non-transitory storage medium according to claim 13, wherein the one or more processors of the terminal further cause the terminal to:
   obtain a pressure value of the touch operation; and
   adjust a size of the operation indication graphic based on the pressure value, wherein the size of the operation indication graphic is positively correlated to the pressure value.

16. The non-transitory storage medium according to claim 13, wherein the one or more processors of the terminal further cause the terminal to:
   display a disappearance picture of the touch graphic when the touch graphic and the operation indication graphic are not connected or overlapped but the touch operation is no longer detected.

17. The non-transitory storage medium according to claim 13, wherein the operation indication graphic is partially displayed on the main planar display area of the cured touch screen.

18. The non-transitory storage medium according to claim 13, wherein the protrusion is formed and enlarged by moving the circle towards the touch graphic along with a minor axis of the ellipse.

* * * * *

UNITED STATES PATENT AND TRADEMARK OFFICE
CERTIFICATE OF CORRECTION

PATENT NO. : 11,630,571 B2
APPLICATION NO. : 17/093188
DATED : April 18, 2023
INVENTOR(S) : Simon Ekstrand et al.

It is certified that error appears in the above-identified patent and that said Letters Patent is hereby corrected as shown below:

In the Claims

In Column 15, Line 13, in Claim 12, delete "cured" and insert -- curved --.

In Column 16, Line 30, in Claim 17, delete "cured" and insert -- curved --.

Signed and Sealed this
Fourth Day of July, 2023

Katherine Kelly Vidal
*Director of the United States Patent and Trademark Office*